US008682459B2

(12) United States Patent
Jinguu

(10) Patent No.: US 8,682,459 B2
(45) Date of Patent: Mar. 25, 2014

(54) DEVICE INFORMATION SETTING APPARATUS AND DEVICE INFORMATION SETTING METHOD

(75) Inventor: Yoshiyuki Jinguu, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 631 days.

(21) Appl. No.: 12/904,454

(22) Filed: Oct. 14, 2010

(65) Prior Publication Data

US 2011/0093097 A1   Apr. 21, 2011

(30) Foreign Application Priority Data

Oct. 15, 2009   (JP) .................................. 2009-238522

(51) Int. Cl.
*G05B 19/42* (2006.01)

(52) U.S. Cl.
USPC .......................................................... 700/86

(58) Field of Classification Search
USPC .......................................................... 700/86
See application file for complete search history.

(56) References Cited

U.S. PATENT DOCUMENTS

| | | | | |
|---|---|---|---|---|
| 5,903,455 A * | 5/1999 | Sharpe et al. | ................... | 700/83 |
| 6,851,087 B1 * | 2/2005 | Sibert | ........................... | 715/236 |
| 8,266,602 B2 * | 9/2012 | Hodson et al. | ................ | 717/137 |
| 8,332,567 B2 * | 12/2012 | Burr et al. | ...................... | 710/315 |
| 2004/0230582 A1 * | 11/2004 | Pagnano et al. | ............... | 707/100 |
| 2007/0075916 A1 | 4/2007 | Bump et al. | | |
| 2007/0226317 A1 * | 9/2007 | Rydberg et al. | ............... | 709/218 |
| 2007/0250180 A1 * | 10/2007 | Bump et al. | ...................... | 700/1 |
| 2007/0282463 A1 * | 12/2007 | Hodson et al. | .................. | 700/20 |
| 2010/0217448 A1 | 8/2010 | Dufaurre | | |
| 2011/0135071 A1 * | 6/2011 | Milstein | ..................... | 379/88.14 |

FOREIGN PATENT DOCUMENTS

| | | |
|---|---|---|
| DE | 102007058606 A1 | 6/2009 |
| JP | 2007-124206 A | 5/2007 |
| JP | 2007124206 A * | 5/2007 .............. H04L 12/28 |
| WO | WO 9929119 A1 * | 6/1999 .............. H04Q 3/00 |
| WO | 2004/046837 A1 | 6/2004 |
| WO | 2009049656 A1 | 4/2009 |

OTHER PUBLICATIONS

Tetsuo Takeuchi, "FDT/DTM Framework for New Field Device Tools"; vol. 51 No. 2 (2007); pp. 15-18 (Japanese version).
Extended European Search Report issued Feb. 17, 2011 in counterpart European Application No. 10187650.6.
Office Action dated Jun. 25, 2012, issued by the State Intellectual Property Office of P.R. China in counterpart Chinese Application No. 201010509751.8.
Japanese Office Action, dated Aug. 11, 2011, issued in Japanese Application No. 2009-238522.

* cited by examiner

*Primary Examiner* — Mohammad Ali
*Assistant Examiner* — Sivalingam Sivanesan
(74) *Attorney, Agent, or Firm* — Sughrue Mion, PLLC

(57) ABSTRACT

There is provided a device information setting apparatus. The apparatus includes: a storage format storing unit configured to store a first storage format of first device information in a first field device and a second storage format of second device information in a second field device; an acquiring unit configured to acquire the first device information based on the first storage format; a conversion unit configured to convert the first device information into the second device information, based on the second storage format; and a writing unit configured to write the second device information in the second field device.

10 Claims, 3 Drawing Sheets

DEVICE INFORMATION SETTING APPARATUS AND DEVICE INFORMATION SETTING METHOD

This application claims priority from Japanese Patent Application No. 2009-238522, filed on Oct. 15, 2009, the entire contents of which are herein incorporated by reference.

BACKGROUND

1. Technical Field

The present disclosure relates to a device information setting apparatus and a device information setting method for setting device information to a field device.

2. Related Art

When the user performs an operation of setting, adjusting, and maintaining a field device with a field bus function, device information is acquired from the field device and is then edited. The device information includes management information of each field device or device parameters peculiar to each device. When the device information is acquired and edited, it is necessary to use a software tool or a program that is uniquely developed by a device vendor. (see e.g., Takeuchi Tetsuo, "FDT/DTM Framework for New Field Device Tools", Yokogawa Technical Report, Yokogawa Electric Corporation, Vol. 51 No. 2 (2007))

The software tool or the program is prepared for each device. When the same type of device has different device revisions, the devices have different numbers of device parameters or different contents. Therefore, in many cases, software or a program is prepared for each device. When the same type of device having the same function has different device revisions, a plurality of software components or a plurality of programs is needed.

However, when the device is replaced, in some cases, it is difficult to prepare the same types of devices with the same revision. In this case, it is difficult to automatically set device information to a new device. For example, when the life span of the field device is long and the field device needs to be replaced due to, for example, a failure, it is difficult to prepare a substitutive device with, the same revision. In this case, it is necessary to manually set device information when the device is replaced, resulting in an increase in the workload of the user. In addition, when the field device is replaced with another field device manufactured by a different manufacturer, a complicated operation is needed to set device information, resulting in an increase in a setting cost.

SUMMARY OF THE INVENTION

Exemplary embodiments of the present invention address the above disadvantages and other disadvantages not described above. However, the present invention is not required to overcome the disadvantages described above, and thus, an exemplary embodiment of the present invention may not overcome any disadvantages It is an illustrative aspect of the invention to provide a device information setting apparatus capable of reducing a workload for setting device information when a device is replaced.

According to one or more illustrative aspects of the invention, there is provided a device information setting apparatus. The apparatus includes: a storage format storing unit configured to store a first storage format of first device information in a first field device and a second storage format of second device information in a second field device; an acquiring unit configured to acquire the first device information based on the first storage format; a conversion unit configured to convert the first device information into the second device information, based on the second storage format; and a writing unit configured to write the second device information in the second field device.

According to one or more illustrative aspects of the invention, there is provided a device information setting method. The method includes: (a) storing a first storage format of first device information in a first field device; (b) storing a second storage format of second device information in a second field device; (c) acquiring the first device information, based on the first storage format; (d) converting the first device information into the second device information, based on the second storage format; and (e) writing the second device information in the second field device.

Other aspects and advantages of the present invention will be apparent from the following description, the drawings and the claims.

DETAILED DESCRIPTION OF EXEMPLARY EMBODIMENTS

Hereinafter, exemplary embodiments of the present invention will be described with reference to the accompanying drawings.

Figure 1:
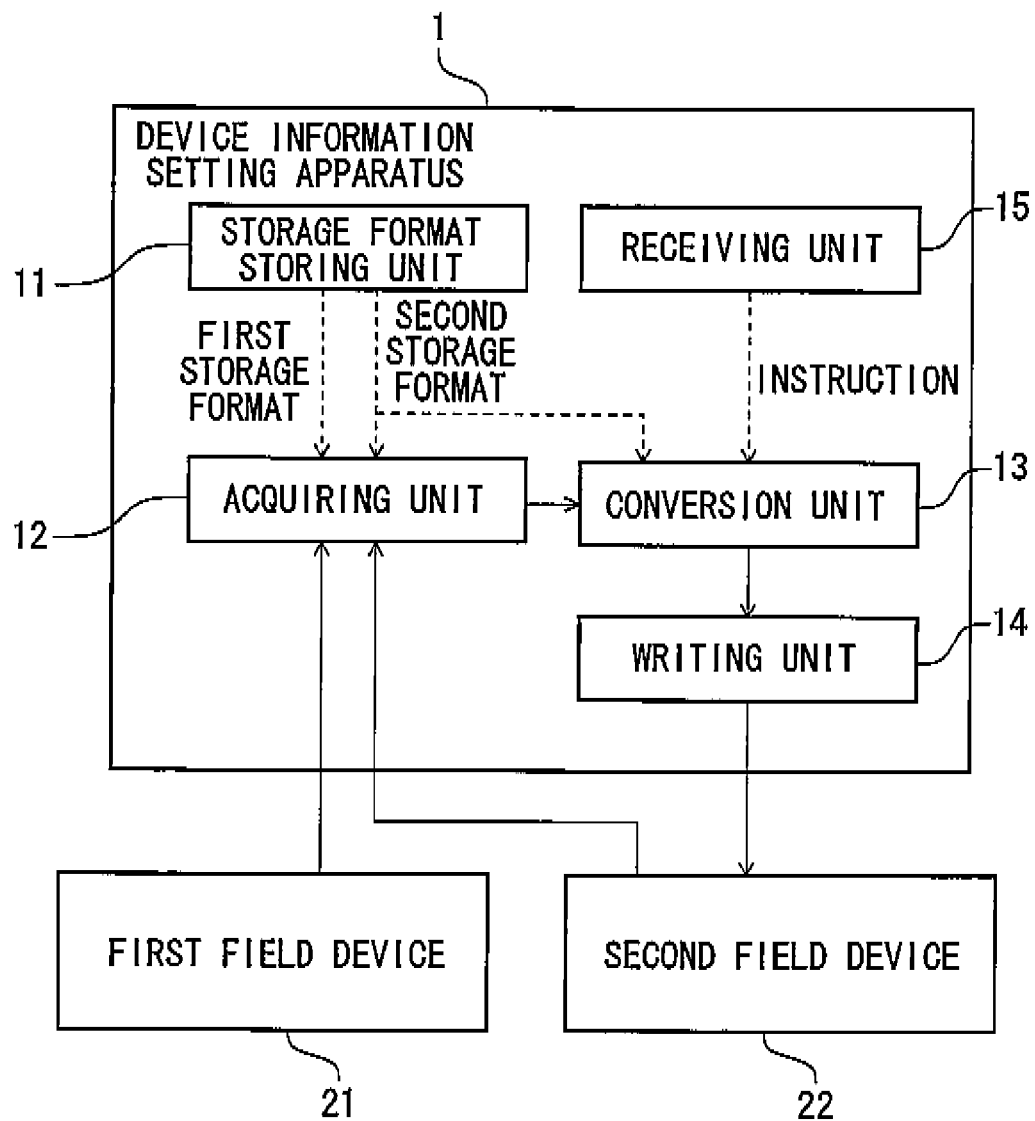
FIG. 1 is a block diagram illustrating a device information setting apparatus according to an embodiment of the invention.

FIG. 1 is a block diagram illustrating the device information setting apparatus according to this embodiment.

Each of a first field device 21 and a second field device 22 shown in FIG. 1 has a field bus communication function, and the first field device 21 and the second field device 22 have the same function. It is assumed when the first field device 21 is replaced with the second field device 22.

As shown in FIG. 1, the device information setting apparatus 1 includes a storage format storing unit 11 that stores the storage format of the device information in the first field device 21 and the storage format of the device information in the second field device 22, an acquiring unit 12 that acquires the device information stored in the first field device 21 based on the storage format of the first field device 21 stored in the storage format storing unit 11, a conversion unit 13 that converts the device information acquired by the acquiring unit 12 into the device information with the storage format in the second field device 22 based on the storage format of the second field device 22 stored in the storage format storing unit 11, a writing unit 14 that writes the device information obtained by the conversion unit 13 to the second field device 22, and a receiving unit 15 that receives an instruction to associate parameters included in the device information of the first field device 21 and the second field device 22.

The device information setting apparatus 1 is configured as a portion of the function of a computer. The computer includes a program that allows the computer to function as the storage format storing unit 11, the acquiring unit 12, the conversion unit 13, the writing unit 14, and the receiving unit 15.

Figure 2:
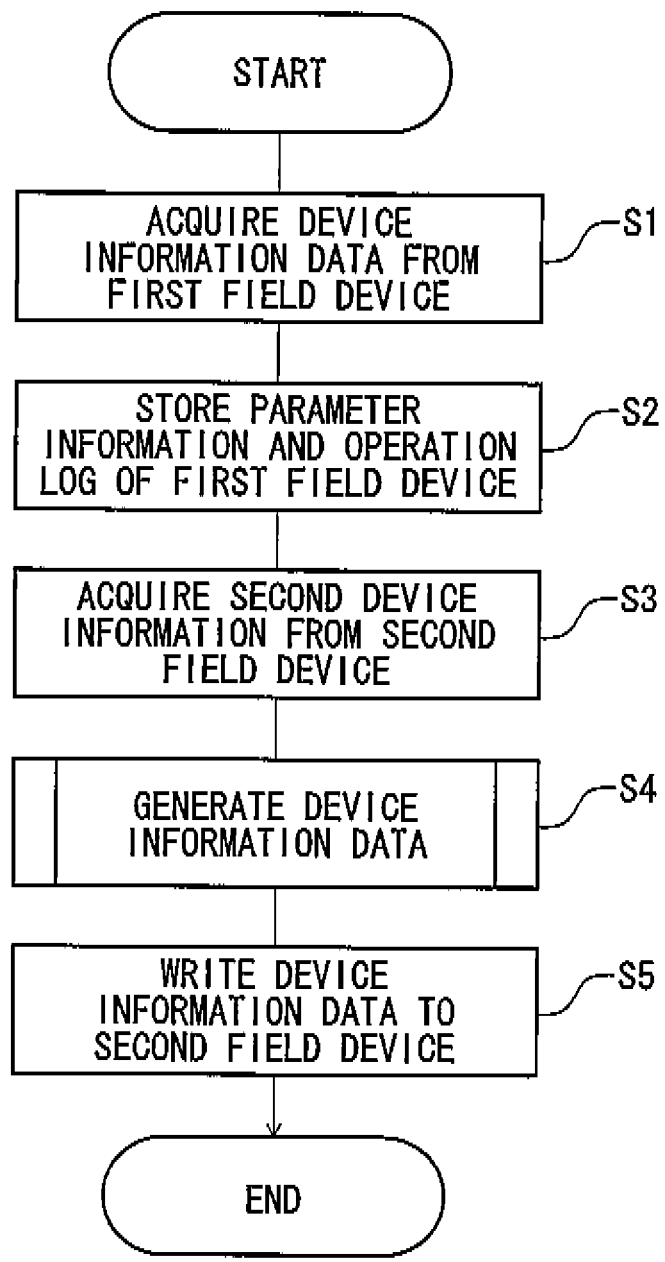
FIG. 2 is a flowchart illustrating the operation of the device information setting apparatus.
Figure 3:
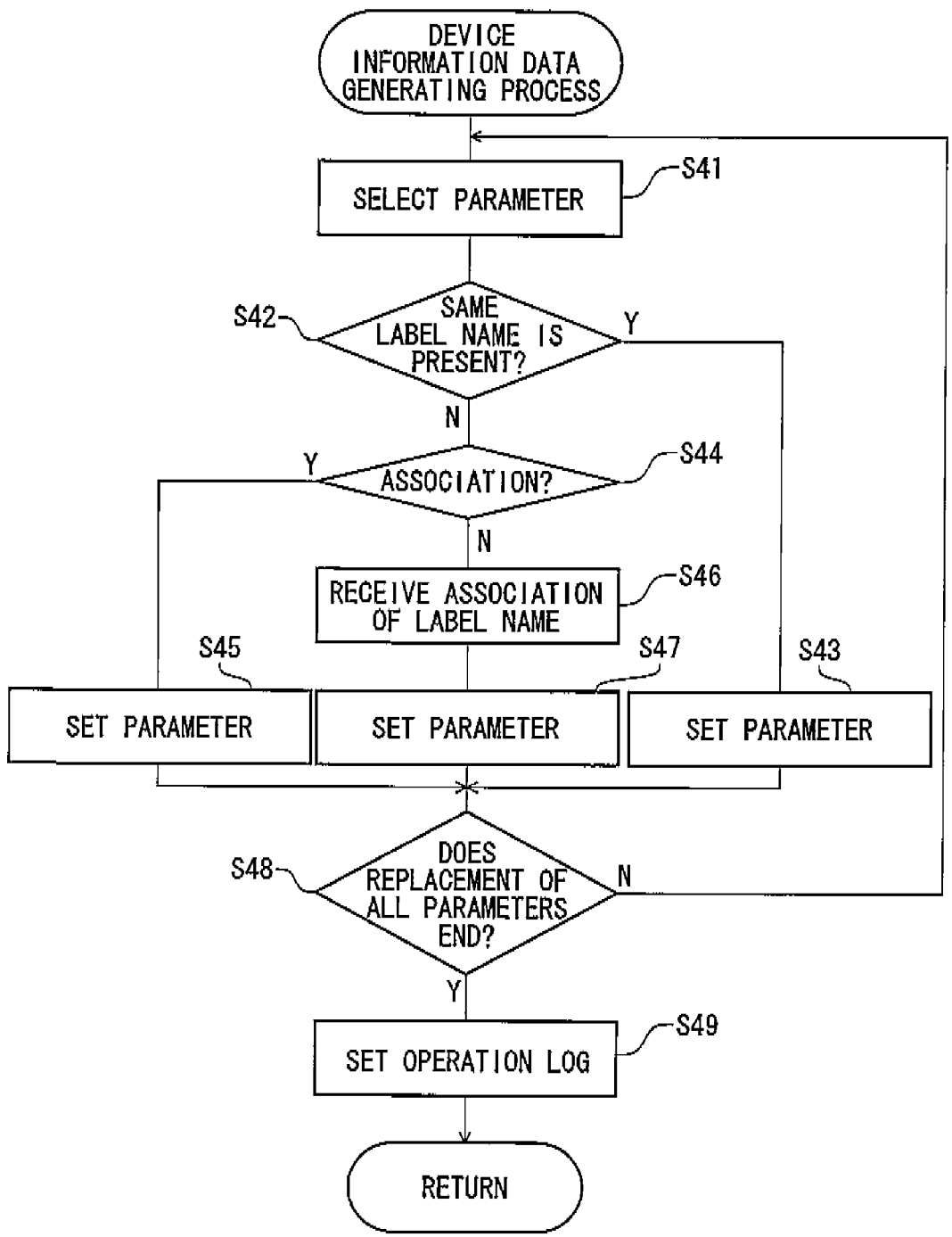
FIG. 3 is a flowchart illustrating a device information data generating process.

FIGS. 2 and 3 are flowcharts illustrating the operation of the device information setting apparatus 1.

In Step S1 of FIG. 2, the acquiring unit 12 acquires and stores device information data stored in the first field device 21.

Then, in Step S2, the acquiring unit 12 extracts device parameters and an operation log from the device information data with reference to the storage format of the first field device 21 stored in the storage format storing unit 11 and stores them. The storage format of the first field device 21 includes information indicating the storage areas of the device parameters and the operation log in the device information data stored in the field device 21. The operation log is history data for the writing, erasion, and editing of the device information data.

Then, in Step S3, the acquiring unit 12 acquires and stores the device information data stored in the second field device 22.

Then, in Step S4, the conversion unit 13 executes a device information data generating process in the following Steps S41 to S46 (FIG. 3). In this process, device information data to be written to the second field device 22 is generated. Namely, the device information stored in the first filed device 21 is converted into the device information to be written in the second field device 22.

In Step S41, one of the device parameters of the first field device 21 stored in Step S2 is selected.

Then, in Step S42, it is determined whether a parameter with the same label name as that of the selected parameter of the first field device 21 is included in the parameter information of the second field device 22, with reference to the storage format of the second field device 22 stored in the storage format storing unit 11. The storage format of the second field device 22 includes information indicating the storage areas of the device parameters and the operation log in the device information data stored in the field device 22. The correspondence between the label name and the parameter may be defined in each of the device information data of the first field device 21 and the device information data of the second field device 22, or it may be defined in each of the storage format of the first field device 21 and the storage format of the second field device 22 stored in the storage format storing unit 11.

If the determination result in Step S42 is "Yes", the process proceeds to Step S43. If the determination result in Step S42 is "No", the process proceeds to Step S44.

In Step S43, for the selected parameter of the first field device 21 (parameter with the same label name), the value of the parameter of the second field device 22 stored in Step S3 is replaced with the value of the parameter of the first field device 21, and the process proceeds to Step S48.

In Step S44, it is determined whether there is a parameter of the second field device 22 associated with the selected parameter of the first field device 21 with reference to the association of the parameter stored in the receiving unit 15.

If the determination result in Step S44 is "Yes", the process proceeds to Step S45. If the determination result in Step S44 is "No", the process proceeds to Step S46.

In Step S45, the value of the parameter of the second field device 22 associated with the selected parameter of the first field device 21 is replaced with the value of the parameter of the first field device 21, and the process proceeds to Step S48.

In Step S46, an operation of designating the parameter of the second field device 22 to be associated with the selected parameter of the first field device 21 is received, and the process proceeds to Step S47. In this case, the receiving unit 15 receives the operation of the user. The user may designate the parameter of the second field device 22 to be associated with the selected parameter of the first field device 21. The association of the parameter designated by the user is stored in the receiving unit 15.

In Step S47, the value of the parameter of the second field device 22 associated with the selected parameter of the first field device 21 is replaced with the value of the parameter of the first field device 21, and the process proceeds to Step S48.

In Step S48, it is determined whether the values of all of the parameters of the first field device 21 have been replaced (Steps S43, S45, and S47). If "Yes", the process proceeds to Step S49. If "No", the process returns to Step S41, and the next parameter is selected.

In Step S49, the data of the operation log of the second field device 22 is replaced with the data of the operation log of the first field device 21. Thus, device information data to be written to the second field device 22 is generated.

Then, in Step S5 (FIG. 2), the writing unit 14 writes the device information data converted by the conversion unit 13, and the process ends. The device information data is transmitted and stored in the second field device 22.

As described above, according to the device information setting apparatus of this embodiment, it is possible to automatically set the value of the parameter with the same label name or the value of the parameter associated by the user. Therefore, it is possible to significantly reduce a workload for setting device information, for example, when the device is changed to another device with a different revision.

In addition, the user may associate the parameters, store the association, and reuse the association to automatically set the device information. Therefore, it is possible to reduce a workload, for example, when the device is changed to a device of another company.

It is also possible to use the device information setting apparatus according to this embodiment to initially set the device information. In this case, a device to be initially set corresponds to the second field device. In addition, the second field device may not be a real device, but it may be a virtual device implemented on the computer. In this case, it is possible to use the device information setting apparatus for, for example, simulations or education.

While the present invention has been shown and described with reference to certain exemplary embodiments thereof, other implementations are within the scope of the claims. It will be understood by those skilled in the art that various changes in form and details may be made therein without departing from the spirit and scope of the invention as defined by the appended claims.

What is claimed is:

1. A device information setting apparatus, comprising:
    a storage format storing unit configured to store a first storage format of first device information in a first field device and a second storage format of second device information in a second field device, wherein the first storage format comprises information indicating storage areas of device parameters and an operation log in the first field device and the second storage format comprises information indicating storage areas of device parameters and an operation log in the second field device;
    an acquiring unit, implemented by a hardware processor, configured to acquire the first device information based on the first storage format;
    a conversion unit, implemented by a hardware processor, configured to convert the first device information into the second device information, based on the second storage format by replacing the device parameters of the second field device with the device parameters of the first field device and replacing the operation log of the second field device with the operation log of the first field device; and a writing unit, implemented by the hardware processor, configured to write the second device information in the second field device.

2. The apparatus according to claim 1, wherein the conversion unit is configured to covert the first device information into the second device information such that values of parameters having the same label name, which are included in the first and second device information, are equal to each other.

3. The apparatus according to claim 1, further comprising:
a receiving unit configured to receive an instruction to associate parameters included in the first and second device information, and
wherein the conversion unit is configured to convert the first device information into the second device information such that the values of the associated parameters are equal to each other in accordance with the instruction received by the receiving unit.

4. The apparatus according to claim 3, wherein a user designates a parameter of the second field device to be associated with a selected parameter of the first field device.

5. The apparatus according to claim 1, wherein the operation log is history data corresponding to writing, editing or erasing of the first device information data in the first field device.

6. A device information setting method, comprising:
(a) storing a first storage format of first device information in a first field device, the first storage format comprising information indicating storage areas of device parameters and an operation log in the first field device;
(b) storing a second storage format of second device information in a second field device, the second storage format comprising information indicating storage areas of device parameters and an operation log in the second field device;
(c) acquiring, by a hardware processor, first device information, based on the first storage format;
(d) converting, by the hardware processor, the first device information into second device information, based on the second storage format by replacing the device parameters of the second field device with the device parameters of the first field device and replacing the operation log of the second field device with the operation log of the first field device; and
(e) writing, by the hardware processor, the second device information in the second field device.

7. The method according to claim 6, wherein step (d) comprises:
converting the first device information into the second device information such that the values of parameters having the same label name, which are included in the first and second device information, are equal to each other.

8. The method according to claim 6, further comprising:
(f) receiving an instruction to associate parameters included in the first and second device information, and
wherein step (d) comprises:
converting the first device information into the second device information such that the values of the associated parameters are equal to each other in accordance with the instruction in step (f).

9. The method of claim 8, wherein a user designates a parameter of the second field device to be associated with a selected parameter of the first field device.

10. The method of claim 6, wherein the operation log is history data corresponding to writing, editing or erasing of the first device information data in the first field device.

* * * * *